United States Patent [19]

Reichbauer et al.

[11] Patent Number: 4,881,074
[45] Date of Patent: Nov. 14, 1989

[54] METHOD FOR FORMING AN ADDRESS TABLE IN A RING-SHAPED COMMUNICATIONS NETWORK

[75] Inventors: Hermann Reichbauer, Munich; Rudi Mueller, Groebenzell; Aldo Riccato, Munich, all of Fed. Rep. of Germany

[73] Assignee: Siemens Aktiengesellschaft, Berlin and Munich, Fed. Rep. of Germany

[21] Appl. No.: 190,691

[22] Filed: May 5, 1988

[30] Foreign Application Priority Data

May 14, 1987 [DE] Fed. Rep. of Germany ....... 3716177
Mar. 4, 1988 [DE] Fed. Rep. of Germany ....... 3807146

[51] Int. Cl.$^4$ .............................. H04J 3/26; H04J 1/16
[52] U.S. Cl. .............................. 340/825.05; 370/94.1; 370/14; 370/85.15
[58] Field of Search ...................... 340/825.05, 825.52; 370/16, 86, 88, 89, 90, 94, 60, 61, 14, 17

[56] References Cited

U.S. PATENT DOCUMENTS

| | | | |
|---|---|---|---|
| 3,787,627 | 1/1974 | Abramson et al. | 370/89 |
| 4,495,493 | 1/1985 | Segarra et al. | 370/86 |
| 4,507,777 | 3/1985 | Tucker et al. | 370/86 |
| 4,677,615 | 6/1987 | Orimo et al. | 370/89 |
| 4,747,100 | 5/1988 | Roach et al. | 370/86 |

OTHER PUBLICATIONS

ANSI/IEEE Std 802.5—1985, "Token Ring Access Method and Physical Layer Specifications".
ANSI Std X3.139—1987, "Fiber-Distributed Data Interface (FDDI)—Token Ring Media Access Control (MAC)".

Primary Examiner—Donald J. Yusko
Assistant Examiner—E. O. Pudpud
Attorney, Agent, or Firm—Hill, Van Santen, Steadman & Simpson

[57] ABSTRACT

A packet sequence is formed in a subscriber station which monitors a token ring network including a number of subscriber stations, the packet sequence containing an address recognition bit at a binary "0" state, a broadcast sequence identifying the packet information as a broadcast packet sequence, and the information field thereof containing either an address signaling request or an address signaling request in the address of its own subscriber station. In the respective following subscriber stations, the received binary state of the address recognition bit is modified to a binary "1" and a further broadcast packet information sequence is formed such that the address recognition bit contains a binary "0" and the most-recently received address is entered into the information field with either the address of the preceding subscriber station or with its own address. The current, complete address table is present in the information field of that broadcast packet information sequence that is received with an unmodified address recognition bit in the subscriber station monitoring the network, either without or after addition of its own address, whereby the sequence of the address information indicates the position of the subscriber stations in the network.

15 Claims, 3 Drawing Sheets

FIG 2

METHOD FOR FORMING AN ADDRESS TABLE IN A RING-SHAPED COMMUNICATIONS NETWORK

BACKGROUND OF THE INVENTION

1. Field of the Invention

The present invention is related to a method for forming an address table in a token ring communications network having at least two subscriber stations each equipped with an access device, wherein data are communicated in packets and a defined, binary level or state is assigned to an address recognition bit of a packet frame sequence assigned to each packet, and the binary information of the address recognition bit is modified in one of the following subscriber stations after the coincidence of the destination of group address specified in the packet frame sequence with the subscriber station's own subscriber address or group address.

2 Description of the Prior Art

In token ring networks having packet-by-packet information communication, a currently-transmitting subscriber station must insert both the originating and the destination addresses into the packet frame sequence. The required destination address can be respectively taken from a address table in the subscriber station, the address table comprising the addresses of all subscriber stations connected to the network.

In order to implement suitable configuration and recovery measures in disturbed (i.e., altered) networks, information concerning the positions of all subscriber stations should be available in each subscriber station in addition to other important decision criteria.

SUMMARY OF THE INVENTION

The object the present invention is to provide tabular information, in an economical manner, i.e. with very little software expense, upon incorporation of methods already implemented in token ring networks now in practice, the tabular information containing the addresses of all operational subscriber stations in token ring network and also the positions of these subscriber stations in the network being capable of being directly obtained from the table.

In conjunction with the method initially set forth above, the object of the invention is achieved in that, after every configuring in the token ring network, a subscriber station that at least temporarily currently monitors the network transmits a broadcast packet sequence provided with an address signaling request and with the attachable address of its own subscriber station. A further transmit broadcast packet sequence is formed in each of the following subscriber stations after the receipt of a broadcast packet sequence with an unmodified address recognition bit. These further sequences are each formed such that an address signaling request and the address received in the information field from the preceding subscriber station are entered into an information field of the further broadcast packet. The address of that subscriber station which follows in the transmission direction to which the most recent address information entered in the information field is assigned is attached to the information field. After the receipt of a broadcast packet sequence having an unmodified address recognition bit, the address and the attached information field are available in the subscriber station currently monitoring the network as a current address table entry representing the position of the subscriber station in the network.

The partial incorporation of ANSI/IEEE-Standardized Transmission Procedures for information in token ring networks is to be considered as a particular advantage of the method of the present invention. According to a subprocedure (see Point 3.2.8 Frame Structure) of one of the standardized procedures (IEEE Standard 802.5), a binary "0" is assigned to an address recognition bit (which is also defined as an A-bit), in a subscriber station that originally forms a packet sequence, the A-bit being inserted at the end of the packet. When one of the following subscriber stations receives a packet whose specified destination or group address, then the respective subscriber station marks the A-bit with "address recognized" in that it modifies the binary "0" information into a binary "I". On the basis of this method, therefore, a "destination subscriber station" forms an "originating subscriber station" that was capable of recognizing the address of the respective packet. In case of a malfunctioning destination subscriber station, the originating subscriber station can identify the operating state of the destination subscriber station by evaluating the A-bit and a further bit, a C-bit termed "frame copied bit". Given incorporation of this address recognition method into the method of the present invention, a subscriber station representing an originating subscriber station and at least partially currently monitoring the network, transmits a broadcast packet instead of a designationally addressed packet. Since the addresses of all subscriber stations can be considered as belonging to a group address given broadcast packet transmission, that respective subscriber station which follows the subscriber station originating the packet information modifies the binary information of the A-bit. When a subscriber station currently monitoring the network transmits a broadcast packet, whose information field includes an address status request and may possibly include its own address, then the following subscriber station modifies the binary stat of the A-bit. As a result of the request to report its address, this following subscriber station, in turn, forms a broadcast packet whose data field contains an address signaling request and its own subscriber station address or the address of the subscriber station preceding in terms of the transmission direction. Upon respective receipt of a A-bit in a binary "0" state, the following subscriber stations each form a further, respective broadcast packet whose information field respectively contains an address signaling request and the addresses of the preceding subscriber stations, these addresses being respectively taken from the information field of the transmitted packet whose A-bit exhibits a binary "0", and also contains its own address or the address of the subscriber stations preceding in terms of the transmission direction. The received broadcast packet sequence is not evaluated in the subscriber station monitoring the network until a broadcast packet sequence having a A-bit marked with a binary "0" is received. This means that a broadcast packet was formed by each subscriber station or that the subscriber station address of each subscriber station was entered into the information field. A complete address table is therefore present in the information field of that broadcast packet whose A-bit is a binary "0", the address table potentially beginning with the address of its own subscriber station.

The method of the present invention can be implemented in equivalent manner with a further known and standardized transmission procedure. In this connection see ANSI-Standard X 3.139, "Fiber Distributed Data Interface (FDDI), Token Ring Access Method". The address recognition bit and the address are thereby entered into the corresponding information fields of a broadcast packet arranged in a slightly different manner.

Since the two alternatives are technically equivalent, whether the respectively following subscriber station attaches the subscriber station address of the preceding subscriber station, or the respective subscriber station attaches its own subscriber station address to the received address information, largely depends on the other methods and procedures used for other jobs and is to be selected accordingly.

According to an advantageous feature of the invention, a numbering bit that is transmitted unmodified by the further subscriber station of the network can be entered into the information field of each broadcast packet provided with an address signaling request, being entered by the subscriber station monitoring the network. On the basis of this numbering bit and on the basis of the perception that the first address of the received address table represents that address of its own subscriber station, a received broadcast packet can be unambiguously assigned to a transmitted broadcast packet provided with an address signaling request. This represents an additional safeguarding measure to still enable unambiguous assignments of transmitted and received broadcast packet sequences in the subscriber station monitoring the network in the case of ring network malfunctions during the address signaling.

Further advantageous features of the invention are that the subscriber station address can be formed with the originating subscriber station address and further subscriber station addresses or can be alternatively formed by an internal configuration sequence of the subscriber station. The method of the invention is therefore co-utilized for the transmission of further address information or configuration information to a subscriber station monitoring the network. All essential sequences that are required for operation and may be required for further configuration operations are therefore present in the subscriber station that monitors the network.

In contrast to the standardized transmission procedure of ANSI/IEEE Standard 802.5, no current subscriber station monitoring the network is appointed according to ANSI Standard X 3.139 following a configuration operation. In order to determine, however, which subscriber stations arranged in the network are allowed to initially access the network, a token claiming is carried our after each disturbance in the network, for example following a configuration modification. The sole "token" for the network is generated and transmitted in the one subscriber station that wins the token claiming. This winning subscriber station, executing a central task in the network, at least temporarily assumes the monitoring the formation of an address table.

Brief-duration overload conditions in the respective subscriber station can occur during the formation of an address table. In these cases, the subscriber station, in fact, remains currently-connected to the network; however, the received packet information can no longer be copied, for example due to a buffer memory overflow, i.e., it can no longer be transferred into the buffer. In order to recognize such operating states of the respective subscriber stations, a copy bit of a prescribed binary state is inserted in the subscriber station originally forming the broadcast packet, the binary state of this copy bit being exclusively modified by the following subscriber station after the copying of the packet sequence. An unmodified copy bit tells a subscriber station originally transmitting the broadcast packet that the following subscriber station was incapable of copying the packet sequence. This safeguarding method, known from the transmission procedures initially set forth, can be utilized with particular advantage in the method of the invention as set forth below. A broadcast packet sequence is thereby again formed and transmitted after receipt of a broadcast packet in the respective subscriber equipment. After n transmissions of broadcast packet sequences where "n" can be determined to be application-oriented in the procedure, the following subscriber station can be considered "malfunctioning" and, for example, a configuring can be initiated.

Due to disturbances or faulty user inputs, subscriber station addresses can occur in duplicate or in multiples in a network. Since these subscriber equipment addresses are utilized for transmission-oriented and safeguarding-oriented control of the individual subscriber station and of the network, an unintended appearance or identical subscriber station addresses should be immediately recognized and appropriate measures should be initiated. What is then particularly advantageous is that initiation of an identification of the appearance of the same subscriber station address before each transmission of a broadcast packet during the formation of an address table, since a determination can thereby be made before the forwarding of a subscriber equipment's own subscriber equipment address whether this subscriber equipment address appears more than once in the network. Dependent on its connection duration and the connection duration of the subscriber equipment having the same address, the respective subscriber station is immediately disconnected from the network or remains connected thereto. The identification of the appearance of the same subscriber station address is initiated after the presence of an address test request of the respective subscriber station. An address test packet sequence is formed and transmitted in the subscriber station. The same, self-address is thereby entered both in the originating address field and in the destination address field of the address test packet sequence. When this subscriber station receives unmodified the address test packet information it transmitted, then it is known that its address is present only once in the network. When this subscriber station receives an address test reply packet this means its address is present at least twice. The receipt of an address test reply packet effects a disconnection from the network in the respective subscriber station. The address test reply packet effects a disconnection from the network in the respective subscriber station. The address test reply packet is formed and transmitted by that subscriber station in the network that has the same subscriber station address as the subscriber equipment that originally transmitted the address test packet. Furthermore, this subscriber station removes the originally transmitted address test packet from the network. Dependent on its connection duration, the subscriber station is subsequently either disconnected from the ring-shaped network or is left in the network. Only in the case in which it remains in the network does the subscriber station provided with the same subscriber station address, form an address test reply packet and transmit the same to the subscriber station that originally sent the address test packet.

When the subscriber station provided with the same subscriber station address is disconnected from the network, neither the originally-transmitted address test packet, nor the address test reply packet is forwarded. In this case, the subscriber station that originally transmitted the address test packet information receives no packet within a prescribed monitoring time interval. Since the subscriber station that originally transmitted the address test packet cannot distinguish whether a disturbance of the ring network or a subscriber equipment having the same address that is not disconnected from the network is present, the formation of an address table is re-initiated after the expiration of the monitoring interval. The critical advantage of determining the appearance of the same subscriber station address in the network during the formation of an address table is that only subscriber station addresses are accepted into the address table present more than once in the network. Furthermore, the address signaling sequentially executed in the network guarantees that only a single subscriber station carries out a determination of the existence identical subscriber station addresses.

According to another advantageous feature of the invention, the formation of an address table is re-initiated in a subscriber station originally transmitting the address test packet information, being re-initiated after n transmission of an address test packet and n monitoring intervals in which neither the address test packet transmitted by that station nor and address test reply packet were received. As a result of the n transmissions of the address test packet, the evaluation of the received address test packet or the formation and transmission of an address test reply packet, is attempted n times in a subscriber station having the same subscriber station address that was, in fact, capable of recognizing and removing the address test packet, but was incapable of forming and transmitting an address test reply packet due to a lack of available hardware and software resources. After n attempts (n depending on the desired error-detecting time), however, the formation of an address table is re-initiated in the respective subscriber station.

According to another advantageous feature of the invention, an identification bit or sequence is inserted in the address test packet as well as in the address test reply packet, by the respective subscriber station transmitting the packet, for the purpose of unambiguous recognition of a packet which the same station transmitted in a plurality of received packet sequences that include its own subscriber station address. On the basis of this identification bit or sequence, a received address test packet information can be unambiguously assigned to a transmitted address test packet. This represents an additional safeguarding measure in order to also enable unambiguous assignments of transmitted and received address test packet or address test reply packet in the respective subscriber station during the determination of identical subscriber station addresses in the network. The identification bit or sequence, for example, can be formed in devices equipped with random generators.

The connection duration of a subscriber station to the network determines whether this station remains in the network or is disconnected therefrom after the identification of the appearance of the same subscriber station address in the network. The connection duration can be defined by different times or by the appearance of modified operating states of a subscriber station that represent different time intervals. After the appearance of the same subscriber station address, for example, a subscriber station is disconnected from the network when this subscriber station has the operating state "newly connected". For example, a subscriber station is in the operating state of "newly connected" as long as its connection duration at the network lies below a prescribed time interval. A further possibility of identifying the operating state of "newly connected" may be that the subscriber equipment is connected thereto after a disturbance in the ring network. Given utilization of the method of the present invention for forming an address table, the subscriber station currently monitoring the network (at least temporarily) sends the current address table to each subscriber station after the execution of the method. A subscriber station can assume the operating state of "newly connected" during this time interval in which the respective subscriber station does not yet have an address table and has not yet received an address table. On the basis of this particularly advantageous identification of the operating state of "newly connected", an immediate disconnection of the subscriber station is possible after the identification of the appearance of two or more identical subscriber station addresses in the network, since the subscriber station identified as "newly connected" has not yet reported its address and, therefore, a current formation of an address table can be continued without interruption.

According to another advantageous development of the invention, a broadcast packet is formed and transmitted by the subscriber station which at least temporarily currently monitors the network. The current address table is copied from the received broadcast packet by all subscriber stations arranged in the network. The insertion of a copy indicator bit into the broadcast packet is particularly advantageous since, after the receipt of the transmitted broadcast packet received with a modified copy indicator bit in the subscriber station that originally transmitted the broadcast packet, an immediate identification can be made as to whether one or more subscriber stations were incapable of copying the current address table. The subscriber station that originally transmits the broadcast packet assigns a prescribed, binary state to the copy indicator bit, this binary state being modified by one of the following subscriber stations inserted in the network and no longer being modified by all subscriber stations following thereupon, insofar as they were incapable of copying the address table contained in the broadcast packet, for example, because of buffer memory overflow. When the subscriber station monitoring the network determines that the address table was incapable of being copied by a subscriber station, the broadcast packet is re-transmitted. After n transmission of a broadcast packet (n can be selected in a user-oriented manner), the address table is transmitted to the subscriber station inserted in the network with designationally-addressed packet information. This makes it possible to identify which of the subscriber stations were incapable of copying the address table.

BRIEF DESCRIPTION OF THE DRAWINGS

Other objects, features and advantages of the invention, its organization, construction and operation will be best understood from the following detailed description, taken in conjunction with the accompanying drawings, in which.

DESCRIPTION OF THE PREFERRED EMBODIMENTS

Figure 1:
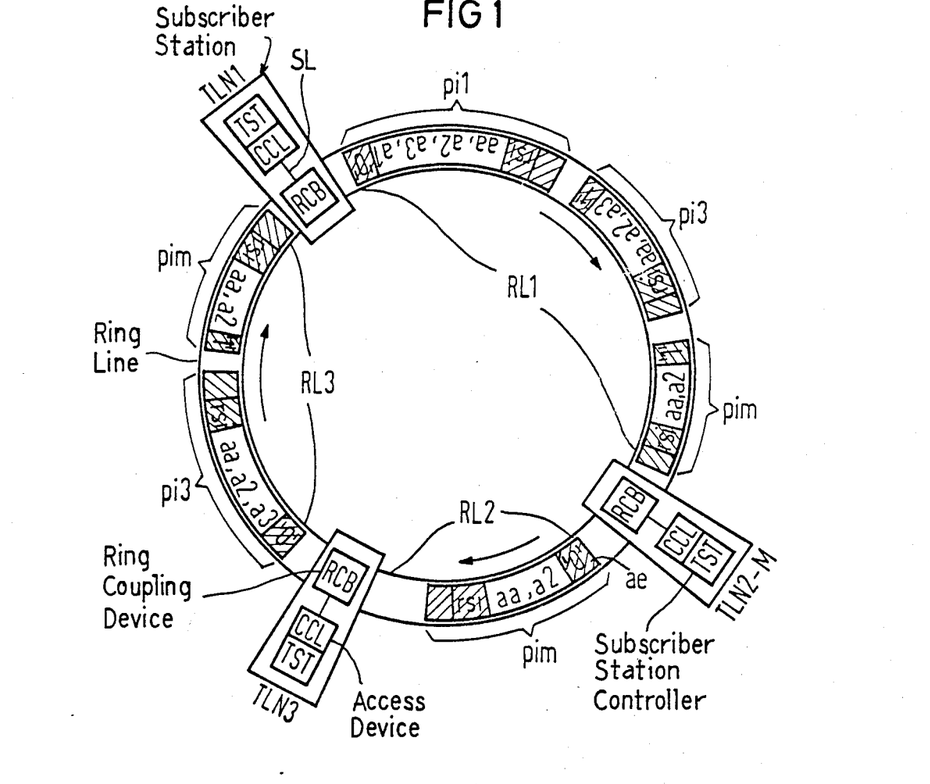
FIG. 1 a schematic illustration of a token ring network including the broadcast packet information relevant for the formation of an address table in accordance with the method of the present invention.

FIG. 1 illustrates those system components of a token ring network which are required for an explanation of the present invention. For example, three subscriber stations TLN1 . . . TLN3 are connected in a ring line RL. The ring line, including the sections RL1 . . . RL3, can be realized with light waveguides or coaxial cables. The three ring line sections RL1 . . . RL3 connect ring coupling devices RCB (forming the ring network) that are respectively arranged in subscriber stations. Dependent on the realization of the ring line RL, the ring coupling devioes RCB contain corresponding transmission or receiving devices. An access device CCL assigned to each subscriber station TLN is respectively connected to the ring coupling device RCB by a multiple spur line SL. The access devices CCL essentially serve the purpose of controlling the transmission procedure used in the ring network. The ring transmission procedure, for example, corresponds the token ring transmission procedure defined in the ANSI/IEEE Standard 802.5 or corresponds to some other ring transmission procedure that must at least comprise the method steps and definitions of Chapter 3.2.8 "Frame Status" of the ANSI/IEEE Standard 802.5. This is necessary since the method of the invention incorporates the method steps and definitions set forth in Chapter 3.2.8. These method steps and definitions also refer to an address recognition method wherein a "destination subscriber station" uses an information modification of an address recognition bit to inform particularly an "originating subscriber equipment" as well as the remaining subscriber station that it has recognized the address information contained in the address information fields. A subscriber station controller TST in each subscriber station TLN coordinates all methods implemented in a subscriber station TLN.

After a configuration operation on the token ring network it is assumed, for example, that the second subscriber station TLN2 is appointed to carry out the monitoring of the network. This is the reason that this second subscriber station TLN2 is referred to as the "monitor subscriber station" TLN2-M. Furthermore, it is assume that packet information pi according to ANSI/IEEE Standard 802.5, Chapter 3, is generated in this monitor subscriber station TLN2-M and in the two further subscriber stations TLN1 and TLN3. Two different packet information sequences are therefore formed, a token packet information sequence and a packet information sequence pi for the communication transmission that is referred to below as packet information pi. A packet information sequence api is composed of a packet frame identification and of an information field. According to ANSI/IEEE Standard, protocol 80.25, Chapter 3, the packet frame information sequence (shown with shading on the drawing) contains a start-of-frame sequence, an end-of-frame sequence, a frame control and a frame-check sequence, as well as an information field in which the destination or originating address is transmitted. After a reacting time following the configuration operation, the monitor subscriber station initiates the formation of an address table. To this end, the monitor subscriber station TLN2-M forms a packet sequence pi in such a manner that the destination address information field contains a transmit information sequence rsi and the information field contains an address signaling request aa as well as its own subscriber equipment address a2. Furthermore, the monitor subscriber station TLN2-M has assigned a binary "0" state to an address recognition bit ae inserted in the packet end-of-frame sequence.

The packet sequence pim formed in this manner in the monitor subscriber station TLN2-M is transmitted in the transmission direction (shown with an arrow adjacent the ring line section RL) to the third subscriber station TLN3 reacts in the following manner to the receipt of this packet information pim:

it identifies that a broadcast packet sequence is involved, that the information field contains an address signaling request aa, and that the address recognition bit ae has a binary "0" state; it changes the logic level of the address recognition bit ae in the packet sequence oim received from the monitor subscriber station TLN2M and transmits this broadcast packet sequence, that is otherwise unmodified, to the first subscriber station TLN1 via the third ring line section RL3; and it forms a further broadcast packet sequence pi3 by assigning a binary "0" to the address recognition bit ae, identifying the broadcast packet information pi as a broadcast packet sequence by entering a transmit information sequence rsi into the destination address information field, and entering the received address information sequence a2 into the information field of the broadcast packet information sequence and attaching its own subscriber equipment address a3.

The broadcast packet information sequence pi3 formed in this manner is the third subscriber station TLN3 likewise proceeds via the ring line section RL3 to the first subscriber station TLN1. The first subscriber station TLNI reacts in the following manner to the receipt of the two broadcast packet sequences pim and pi3:

it recognizes that the address recognition bit ae in the broadcast packet information sequence pim originally transmitted by the monitor subscriber station TLN2-M is a binary "1" state, whereupon it immediately transmits this broadcast packet sequence pim onto the first ring line section RLI and, therefore, to the monitor subscriber station TLN2-M;

it recognizes that the broadcast packet station pi3 received from the third subscriber station TLN3 is a broadcast packet sequence, that the address recognition bit ae in this packet seuence pi3 is a binary "0" and that an address signaling request aa and subscriber station address a2 and a3 are inserted in the information field, and since the first subscriber station TLN1 follows the third subscriber station TLN3 in the transmission direction, it modifies the binary "0" of the address recognition bit aa to a binary "1" and transmits the received broadcast packet information sequence pi3, otherwise unmodified, to the monitor subscriber station TLN2-M via the first line section RL1; and after the recognition of the address signaling request aa in the broadcast packet information sequence pi3 received from the third subscriber station TLN3, a further broadcast packet information sequence pi1 is formed in the first subscriber station TLN1 by assigning a binary "0" state to the address recognition bit ae of the broadcast packet information sequence pi1, defining this packet information sequence pi1 as a broadcast packet information sequence by entry of a broadcast sequence rsi into the destination address information field, generating an address signaling request aa, inserting the received address information a2 and a3 of the third subscriber station TLN3 and, subsequently, the address a1 of its own subscriber station TLN1 into the information field, and forwarding the broadcast packet information sequence pi1 formed in this manner by the ring line section RL1 to the monitor subscriber station TLN2-M.

The monitor subscriber station TLN2-M reacts to the reception of the three packet sequences psm, pi1, pi3 in the following manner:

it recognizes that the address recognition bit ae is a binary "1" in the first two received broadcast packet sequences pim and pi3, whereupon the monitor subscriber station TLN2-M removes the first-received broadcast packet sequence pim and the broadcast packet sequence pi3 subsequently received is forwarded without further interpretation onto the second ring line section RL2; and it recognized that the address recognition bit ae in the packet sequence pi1 last received is a binary "0" and concludes therefrom that the broadcast packet sequence pi1 last received was originally generated and transmitted from the preceding subscriber station in the transmission direction, in this case, the first subscriber equipment TLN1, and this means that all subscriber stations TLN of the network formed a broadcast packet sequence, and that the information field of the broadcast packet sequence pi1 last received contains the addresses a2, a3 and a1 of all the subscriber stations TLN, these addresses a2, a3 and a1 being copied out of the information field and entered into an address table and a complete address table is therefore present which first, contains the address information a2, a3, a1 and secondly, the sequence of the addresses specifies the sequence or the position of the subscriber stations TLN in the network, and this address table is to be distributed to all subscriber stations TLn of the token ring network with suitable methods.

After one propagation around the ring, the broadcast packet sequences psm, pi3 and pi2 are, in turn, removed by those subscriber stations TLN in which the packet sequences were generated and initially transmitted.

Figure 2:
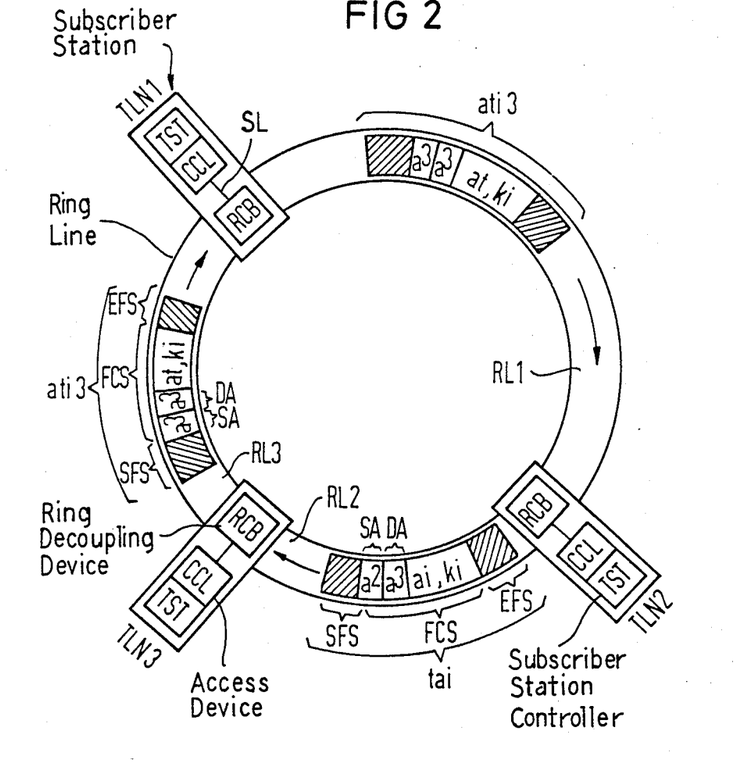
FIG. 2 is a schematic illustration of a token ring network including the packet information relevant for determining the appearance of the same subscriber equipment address in accordance with the method of the present invention.

In terms of the arrangement and functions of the individual system components, the network shown in FIG. 2 corresponds to the network of FIG. 1. As in FIG. 1, the token rin transmission procedure X 3.139, standardized in ANSI, is provided for the determination of the appearance of the same subscriber station address for a subscriber station in the network that is set forth below. It is here assumed, for this exemplary embodiment, that an address test request is formed, for example during the formation of an address table, in the third subscriber station TLN3. As a result of the presence of an address test request, an address test packet sequence ati3 is formed in the third subscriber station TLN3.

According to ANSI standard X 3.139, a packet sequence is formed by a packet frame sequence (marked with shading in FIG. 2) and by a frame-check sequence FCS. The packet frame sequence contains a startof-frame sequence SFS that is placed in front of the FCS and contains an end-of-frame sequence EFS that is attached to the FCS. The FCS is composed of an information field, the originating and destination address fields Sa and DA, and a control field. The subscriber station address a3 of the third subscriber station TLN3 is entered both in the originating address field SA and in the destination address field DA of this address test packet ati3. This means that the address test packet ati3 is designated as addressed to its own subscriber station TLN3. An address test sequence at is entered in the information field, being identified as an address test packet sequence ati as a result thereof. An identification sequence or character ki is additionally entered into this information field. This identification character or sequence ki is specifically identified for each packet to be transmitted. This, for example, can occur with the assistance of a random generator at whose output a random bit combination or character ki is present. In the third subscriber sequence TLN3, this identification character or sequence ki facilitates the unambiguous recognition of the address test packet ati3 formed in this manner and according to ANSI X 3.139 standard is transmitted from the subscriber station TLN3 via the ring coupling device RCB to the third ring line section RL3 and proceeds via the following ring coupling device RCB to the access device CCL of the first subscriber station TLN1. Since the address test packet ati3 is not addressed to the first subscriber station TLN1, this is immediately transmitted via the ring coupling means RCB to the first ring line section RL1 and proceeds via the following ring coupling device RCB to the access device CCL of the second subscriber station TLN2 and that of the third subscriber station TLN3 coincide, for example, due to a ring network disturbance or due to a faulty user input during the network initialization. Deviating from the ANSI X 3.139 standard, the address test packet ati3 is not removed from the network until after the additional interpretation or evaluation thereof, since it is initially assumed in the second subscriber station TLN2-M that the received information is an address test packet that it transmitted to itself. This additional interpretation, i.e. logic checks of the address test packet and, specifically of the identification character or information ki in the second subscriber station TLN2-M, however, show that this address test packet ati3 was not transmitted by this station. Dependent on the connection duration (see the foregoing in the introduction with respect thereto), the second subscriber station TLN2-M can now be disconnected from the network or an address test reply packet tai can be formed. Let it be assumed for the exemplary embodiment that an address table is present in the second subscriber station TLN2-M, meaning that his second subscriber station TLN2-M has already been connected to the network for a longer time. Consequently, an address test reply packet tai is formed in the second subscriber station TLN2-M according to the ANSI Standard X 3.139 and is transmitted onto the second ring line section RL2. The address a3 of that subscriber station TLN3 that had originally transmitted the address test packet ati3 is thereby entered in the destination address field DA. The address test sequence at is modified into an address test reply sequence tai. In order to enable an unambiguous allocation of transmitted address test packet ati3 to received address test reply packet tai in the subscriber station TLN3 that originally transmitted the address test packet information ati3, the originally-determined identification character ki remains entered in the information field via the second ring line section RL2. Via the following ring coupling device RCB, the address test reply packet tai arrives at the access device CCL of the third subscriber station TLN3 This is identified therein on the basis of the modified address test sequence at that an address test packet tai is involved. This means that a subscriber station TLN is present in the network that has been assigned the same subscriber station address a3 as the third subscriber station TLN3 and was not disconnected from the network.

Consequently, the third subscriber station TLN3 is disconnected from the network and a reconnection of the carried out until after its subscriber station address has been modified. This means that the contents of an address table in the network is interrupted and is subsequently re-initiated. When the disconnected third subscriber station TLN3 is reconnected to the network, the formation of an address table in the network is re-initialized or re-initiated.

When the address test packet ati3 transmitted by the subscriber station TLN3 which originally transmitted the address test packet ati3 is received unmodified in the subscriber station TLN3, it is insured that its subscriber station address a3 is present only once in the network. The formation of an address table can be subsequently continued by transmitting tan address signaling request. Within the framework of forming an address table, the determination of the single appearance of the same subscriber station address a is carried out in the network for each subscriber station TLN. It is thereby assured that address tables are formed that contain no duplicate subscriber station addresses a.

Figure 3:
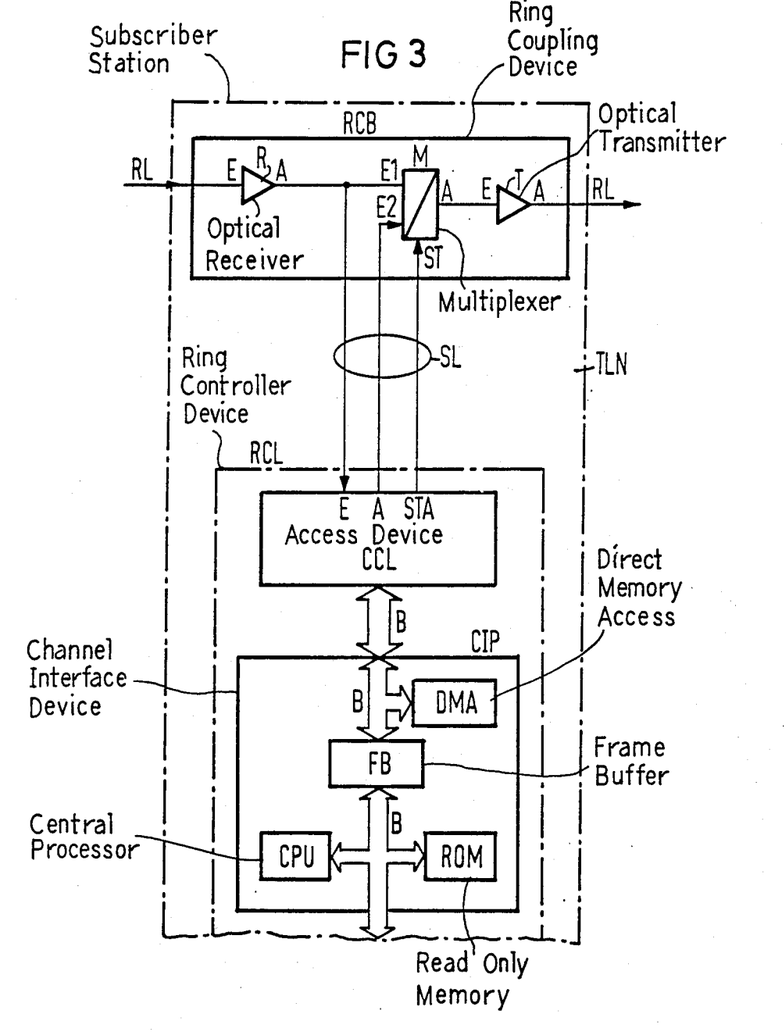
FIG. 3 a block circuit diagram of a subscriber station which may be employed in practicing the method of the present invention.

FIG. 3 illustrates those systems components of a subscriber station TLN that carry out the formation and interpretation of packet information and, therefore, also carry out the formation of an address table. The subscriber station TLN is composed of a ring coupling device RCB, a ring controller device RCL and further devices (not shown) that control internal methods and procedures of the subscriber station. The ring coupling device RCB can be integrated in the subscriber station TLN or it can be externally arranged, connected to the subscriber station TLN via a corresponding spur line SL. For example, the ring line RL can be realized with optical light wave guides. The ring line RL that is incoming, in terms of transmission direction, is thereby connected to an input E of an optical receiver R. The output of the optical receiver R is connected by correspondingly-arranged lines to a first input E1 of a multiplexer M and to an input E of an access device CCL arranged in the ring controller device RCL. A second input E2 of the multiplexer M is connected to an output A of the access device CCL. With its control output STA, the access device CCL controls the multiplexer M via a corresponding connection and with the control input ST. The output A of the multiplexer M is conducted to an input E of an optical transmitter T. The ring line RL that is out-going, in terms of transmission direction, is connected to the output A of the optical transmitter T. The ring coupling device RCB has the following jobs assigned thereto:

regenerating the information signals incoming on the ring line RL;

forwarding the information signals to the ring controller device RCL;

inserting the information signls incoming from the ring controller device RCL into the information stream of the network with the multiplexer M; and given a malfunctioning ring controller device RCL, directly forwarding the incoming information signals onto the ring line RL which is outgoing, in terms of transmission direction, with the multiplexer M that is correspondingly controlled by the control input ST.

The system components of the ring coupling device RCB can, for realized, for example, in the following manner:

the multiplexer M may be a 74 F 157 circuit of the fast technology of the Fairchild firm;

the optical receiver R may be a Siemens V 42253-H4-B4 circuit; and the optical transmitter T may be a Siemens V 42253-G4-B5 circuit.

The access device CCl and the channel interface device CIP are arranged in the ring controller device RCL. The access device CCL controls the access of the subscriber station TLN to the network. This access occurs, for example, based on the access protocol according to the ANSI/IEEE Standard 802.5. The access device CCL can be realized with an integrated circuit from Texas Instruments which is identified as the TMS circuit. This integrated circuit forms and evaluates the ring information according to above-mentioned access protocol of the ANSI/IEEE Standard 802.5. The access device CCL is connected to a channel interface controller CIPO via a bus line system B arranged in a known manner. This channel interface controller CIP represents the link element to the internal equipment of the subscriber station. In this equipment, evaluation of the information incoming from both directions is undertaken and further information may potentially be formed therein and be forwarded to the units connected thereto. The channel interface controller CIP, for example, can be formed with the system components:

a central processor CPU as a central controller;

a read only memory ROM;

a frame buffer FB as a frame compensation memory; and direct memory access DMA as a control module for direct memory access.

The connection of the individual system components to one another occurs by bus line systems B which are standard for microprocessor systems and that are arranged in a known manner.

The central processor CPU can be realized with the microprocessor system of Siemens, which microprocessor system is known as the SAB 8088, circuit, the "read only memory" can be realized with the integrated circuit of Siemens known as the SAB 2764a, the "frame buffer" can be realized with the integrated circuit of Siemens known as the SAB 2113a, and the "direct memory access" can be realized with the integrated circuit known as the SAB8237.

Although we have disclosed our invention by way of preferred embodiments thereof, many changes and modifications may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for forming an address table in a token ring network having a plurality of subscriber stations, each having an address, among which information is transferred by transmission, in a transmission direction, of data packets consisting of the token and a frame, said method comprising the steps, after each configuring of a network, of:
   (a) forming, in a first subscriber station a temporarily monitoring said network, a frame including an address signaling request, an address recognition bit having a selected binary state, and an information field including the address of said first subscriber station;
   (b) broadcasting, from said first subscriber station, data packet including the frame formed in step (a);
   (c) changing the state of said address recognition bit in each subscriber station upon receipt of a data packet addressed to it with said address recognition bit in said selected binary state, and returning the data packet, otherwise unchanged, to the network;
   (d) forming, in each subscriber station after receipt of a data packet with an address recognition bit in said selected binary state, a further data packet having a frame including an address recognition bit having said selected binary state, an address signal request, and an information field including the contents of the information field in the received data packet with the address recognition bit in the selected binary state plus the address of the subscriber station immediately following, in the transmission direction, the last address in said contents;
   (e) upon receipt by said first subscriber station of a data packet with an address recognition bit in said selected binary state, entering the address or addresses in the information field of the received data packet with the address recognition in said selected binary state into an address table in said first subscriber station; and
   (f) monitoring the network with said first subscriber station using said address table.

2. the method of claim 1 wherein step (d) is further defined by:
   forming, in each subscriber station after receipt of a data packet with an address recognition bit in said selected binary state, a further data packet having a frame including an address recognition having said selected binary state an address signaling request, and an information field including the contents of the information field in the received data packet with the address recognition bit in the selected binary state plus the address of the subscriber station which is forming said further data packet.

3. A method as claimed in claim 1 wherein step (d) is further defined by:
   forming, in each subscriber station after receipt of a data packet with an address recognition bit in said selected binary state, a further data packet having a frame including an address recognition bit having said selected binary state, and address signaling request, and an information field including the contents of the information field in the received data packet with the address recognition bit in the selected binary state plus the address of the subscriber station immediately preceding the subscriber station which is forming said further data packet.

4. The method of claim 3 further defined by the step of:
   deriving the address of said immediately preceding subscriber station from said contents of the information field in said received data packet.

5. The method of claim 1 comprising the additional step of:
   assigning a number, in said first subscriber station, to said data packet broadcast from said first subscriber station, said number being transmitted unchanged through said work by each subscriber station.

6. The method of claim 2 wherein the address of the subscriber station which is forming said further data packet and which is to be entered into said information field in said further data packet is formed using internal configuration information in the subscriber station which is forming said further data packet.

7. The method of claim 1 comprising the additional step of:
   selecting, as said first subscriber station temporarily monitoring said network, the subscriber station which is first to generate an access sequence and to transmit said access sequence onto said network following a configuring of the network.

8. The method of claim 7 comprising the additional steps of:
   including a copy bit in said frame formed in said first subscriber station, said copy bit having a selected binary state;
   each subscriber station copying the contents of the information field of a data packet received with a copy bit in said selected binary state;
   changing the binary state of said copy bit in the received data packet; and
   re-transmitting the data packet with the copy bit having the changed binary state.

9. The method of claim 1 comprising the additional steps, preceding steps (a) through (f) for forming an address table, of:
   forming, in each subscriber station, an address test request to determine whether another subscriber station in the network has the same address as the subscriber station originating the address test request;
   transmitting the address test request around said network with the address of test request the originating subscriber station; and
   receiving and evaluating said address test request in the origination subscriber station after transmission around said network.

10. The method of claim 9 comprising the additional steps of:
   upon the receipt by a subscriber station of an address test packet, adding a data sequence to said address test packet identifying the unique presence in said network of the subscriber station receiving the address test packet, the subscriber station which received the address test packet thereafter returning the address test packet with the data sequence attached thereto to the network;
   upon receipt of an address test packet with said data sequence attached thereto by a subscriber station having the same address but which did not originate said address test packet, disconnecting from the network the subscriber station with the same address which did not originate the address test packet with the data sequence attached thereto.

11. The method of claim 9 comprising the additional steps of:

upon the receipt by a subscriber station of an address test packet, adding a data sequence to said address test packet identifying the unique presence in said network of the subscriber station receiving the address test packet, the subscriber station which received the addres test packet thereafter returning the address test packet with the data sequence attached thereto to the network;

upon receipt of an address test packet with said data sequence attached thereto by a subscriber station having the same address but which did not originate said address test packet, forming an address test reply packet in said subscriber station having the same address and transmitting said address test reply packet to the subscriber station which originated the address test packet with the data sequence attached thereto; and upon receipt of an address test reply packet by said subscriber station which originated the address test packet with the data sequence attached thereto, disconnecting from the network the subscriber station which originated the address test packet with the data sequence attached thereto.

12. The method of claim 11 comprising the step initiating steps (a) through (f) to form an address table after n transmissions of an address test packet and n monitoring times during which neither the address test packet nor an address test reply packet is received, $n \geq 1$.

13. The method of claim 1 comprising the additional step of:

inserting an identification sequence into to said address test packet and into said address test reply packet, said identification sequence unambiguously identifying the source of said address test packet and said address test reply packet.

14. The method of claim 13 comprising the additional steps, after formation of an address table in steps (a) through (f), of:

transmitting said address table to all subscriber stations around said network; and copying said address table in each subscriber station.

15. The method of claim 1 comprising the additional steps of:

after step (e), attaching a copy indicator bit having a selected binary level to said address table;

in step (f), broadcasting said address table with the copy indicator bit to said network;

copying said address table in each subscriber station upon receipt thereof and returning the address table to the network for re-transmission without changing the binary state of the copy indicator bit;

in any subscriber station which is unable to copy said address table, changing the binary state of said copy indicator bit and returning the address table to the network for re-transmission to said first subscriber station; and re-transmitting said address table from said first subscriber station upon receipt by said first subscriber station upon receipt by said first subscriber station of an address table with a changed copy indicator bit.

* * * * *